United States Patent [19]

Nakajima

[11] Patent Number: 5,136,571
[45] Date of Patent: Aug. 4, 1992

[54] DISK CARTRIDGE LOADING APPARATUS

[75] Inventor: Yuji Nakajima, Hadano, Japan

[73] Assignee: Ricoh Company, Ltd., Tokyo, Japan

[21] Appl. No.: 664,022

[22] Filed: Mar. 4, 1991

[30] Foreign Application Priority Data

Mar. 29, 1990 [JP] Japan .................. 2-31819[U]

[51] Int. Cl.⁵ .................. G11B 33/02; E11B 17/04
[52] U.S. Cl. ........................... 369/77.2; 369/75.1;
 369/75.2; 369/77.1; 360/99.02; 360/99.03;
 360/99.06; 360/99.07
[58] Field of Search ............... 369/75.1, 75.2, 77.1,
 369/77.2; 360/99.02, 99.03, 99.06, 99.07

[56] References Cited

U.S. PATENT DOCUMENTS

| | | | |
|---|---|---|---|
| 4,686,665 | 8/1987 | Kamoshita | 369/77.2 |
| 4,807,068 | 2/1989 | Shiraishi | 369/77.1 X |
| 4,829,504 | 5/1989 | Sunaga et al. | 369/77.2 X |
| 4,890,276 | 12/1989 | Ono et al. | 369/77.2 |
| 4,896,312 | 1/1990 | Odawara et al. | 369/77.2 |
| 5,005,093 | 4/1991 | Inoue et al. | 369/77.2 X |

Primary Examiner—Stuart S. Levy
Assistant Examiner—Tan Nguyen
Attorney, Agent, or Firm—Cooper & Dunham

[57] ABSTRACT

A disk cartridge loading apparatus for ejecting a disk cartridge by operating an ejecting knob from a loading state of the disk cartridge has a head moving device for supporting and moving a recording-reproducing head; and a head escaping device for escaping the head moving device to a predetermined position at a former operating stroke of the ejecting knob. The loading apparatus may further has a stopper for restricting an operating range of the head escaping device. An ejecting operation of the disk cartridge is performed at a latter operating stroke of the ejecting knob in a state in which the recording-reproducing head is escaped from a recording disk. The loading apparatus may further has a slanting cam groove having a horizontal portion in a central portion thereof and formed in a carriage for operating the head escaping device. The ejecting operation of the disk cartridge may be performed at the latter operating stroke of the ejecting knob provided by the horizontal portion of the slanting cam groove.

5 Claims, 8 Drawing Sheets

DISK CARTRIDGE LOADING APPARATUS

BACKGROUND OF THE INVENTION

1. Field of the Invention

The present invention relates to a disk cartridge loading apparatus for performing loading and unloading operations with respect to a disk cartridge having a recording disk therein so as to record and reproduce data.

2. Description of the Related Art

In a general disk cartridge loading apparatus, when a power source is suddenly turned off in an accessing state by a certain cause, a magnetic head remains left on a magnetic disk so that a disk cartridge cannot be taken out of a deck.

When a door-locking lever is compulsorily rotated in the above operating state to perform an ejecting operatioin of the disk cartridge, there is a problem that the magnetic disk or the magnetic head is damaged.

SUMMARY OF THE INVENTION

It is therefore an object of the present invention to provide a disk cartridged loading apparatus for reliably performing the ejecting operation of a disk cartridge even when a power source is suddenly turned off.

The above object of the present invention can be achieved by a disk cartridge loading apparatus for ejecting a disk cartridge by operating an ejecting knob from a loading state of the disk cartridge, said apparatus comprising head moving means for supporting and moving a recording-reproducing head; and head escaping means for escaping said head moving means to a predetermined position at a former operating stroke of said ejecting knob.

In the above structure, the head moving means for moving the recording-reproducing head is escaped to the predetermined position through the head escaping means at the former operating stroke of the ejecting knob. An ejecting operation of the disk cartridge is performed at a latter operating stroke of the ejecting knob in a state in which the recording-reproducing head is escaped from a recording disk.

Accordingly, in the above disk cartridge loading apparatus, the ejecting operation of the disk cartridge is reliably performed even when a power source is suddenly turned off.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a disk cartridge loading apparatus in the present invention will next be described in detail with reference to the accompanying drawings.

Figure 1:
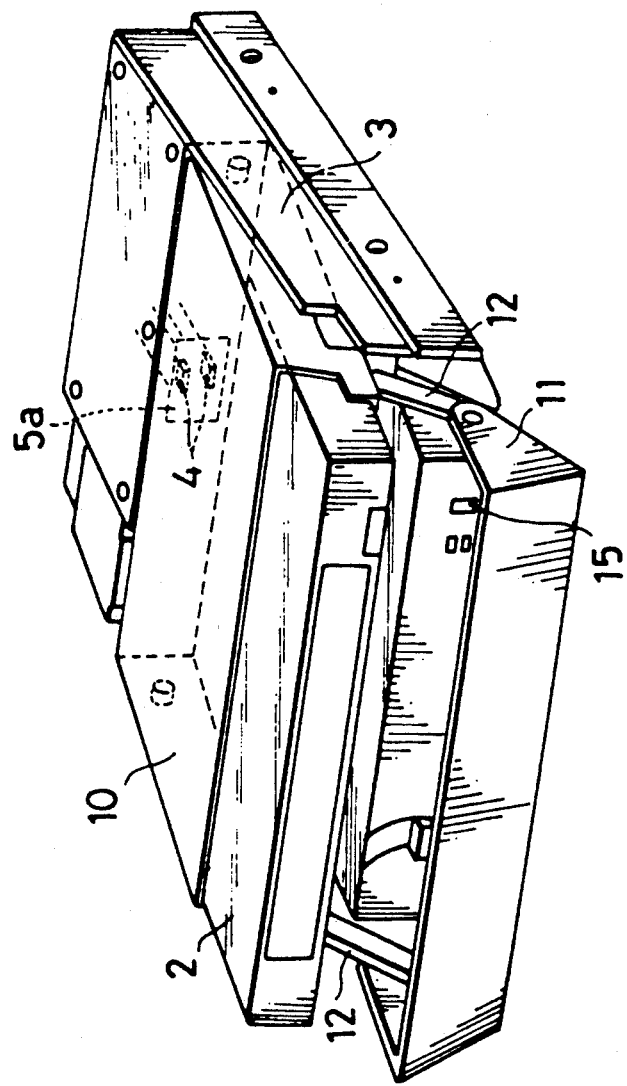
FIG. 1 is a perspective view showing an ejection state of a disk cartridge in a general magnetic disk driving apparatus of a cartridge type.
Figure 2:
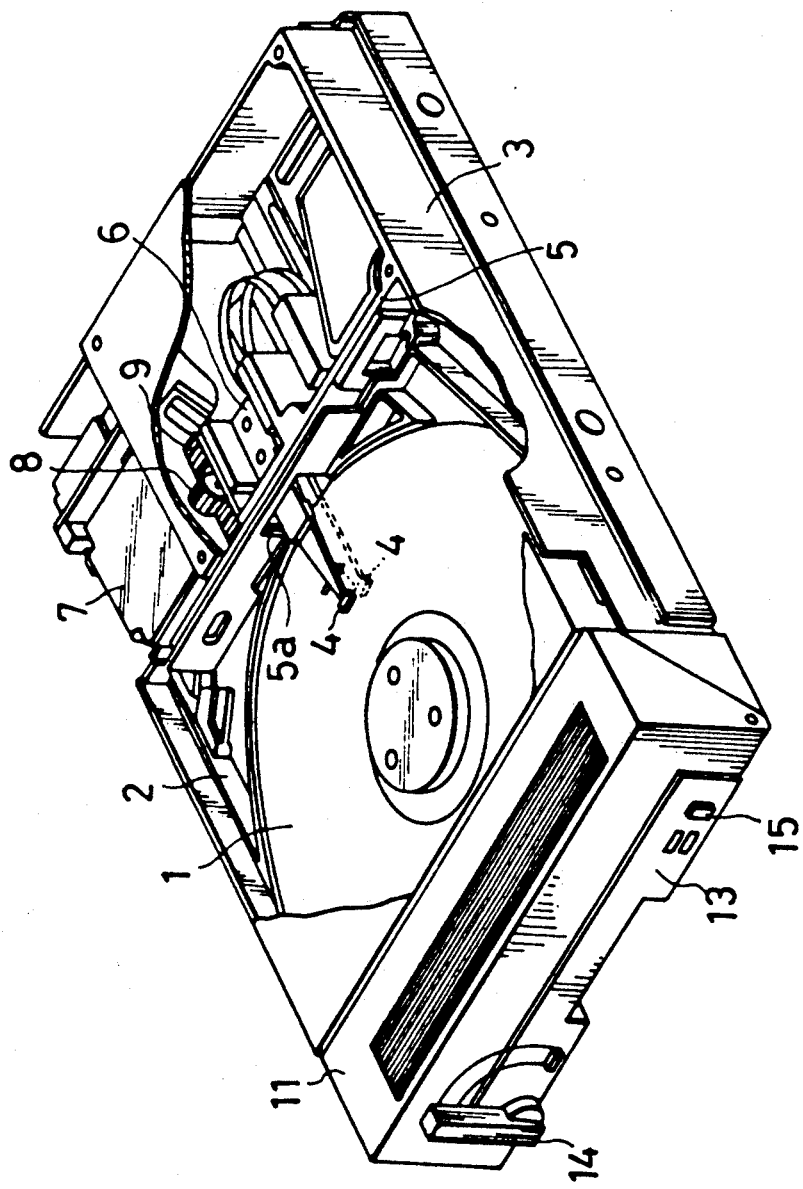
FIG. 2 is a partially cross-sectional perspective view showing an accessing state of the general magnetic disk driving apparatus shown in FIG. 1.

FIG. 1 is a perspective view showing an ejecting state of a disk cartridge in a general magnetic disk driving apparatus of a cartridge type. FIG. 2 is partially cross-sectional perspective view showing an accessing state of the general magnetic disk driving apparatus shown in FIG. 1. In FIGS. 1 and 2, a magnetic disk 1 is stored within a disk cartridge 2 and is rotated by an unillustrated spindle motor disposed within a deck 3. A magnetic head 4 for record and reproduction can be moved onto a recording face of the magnetic disk 1 from a head access window 5a formed in a partition wall 5 within the deck 3. The magnetic head 4 is mounted on a magnetic head mounting portion 6. A step motor 7 moves the magnetic head mounting portion 6 through a pinion gear 8 and a rack 9. The disk cartridge 2 is stored in a receiver 10 such that the disk cartridge 2 can be moved into and out of the receiver 10. A front cover 11 is rotatably disposed in a front portion of the deck 3 through levers 12 such that an open portion of the deck 3 is covered by the front cover 11. A door-locking lever 14, a start/stop switch 15, etc. are disposed in a front panel 13.

In FIGS. 1 and 2, when the disk cartridge 2 arranged within the deck 3 is ejected or taken out of this deck 3, an operator pushes the start/stop switch 15. Thus, a rotation of the spindle motor is stopped so that a rotation of the magnetic disk 1 is stopped. At this time, the magnetic head 4 is moved and escaped backward from the head access window 5a by rotating the step motor 7 is a reverse direction. In this operating state, the door-locking lever 14 is rotated to release a door-locking state. When the front cover 11 is then rotated downward, the level 12 is rotated to move the receiver 10 upward on a front side thereof. Thus, an engaging state of the disk cartridge 2 and the spindle motor is released so that it is possible to pull-out the disk cartridge 2 on a front side thereof.

In the above general apparatus, when a power source is suddenly turned off in an accessing state by a certain cause, the magnetic head 4 remains left on the magnetic disk 1 so that the disk cartridge 2 cannot be taken out of the deck 3.

When the door-locking lever 14 is compulsorily rotated in the above operating state to perform the ejecting operation of the disk cartridge, there is a problem that the magnetic disk 1 or magnetic head 4 is damaged.

Figure 3:
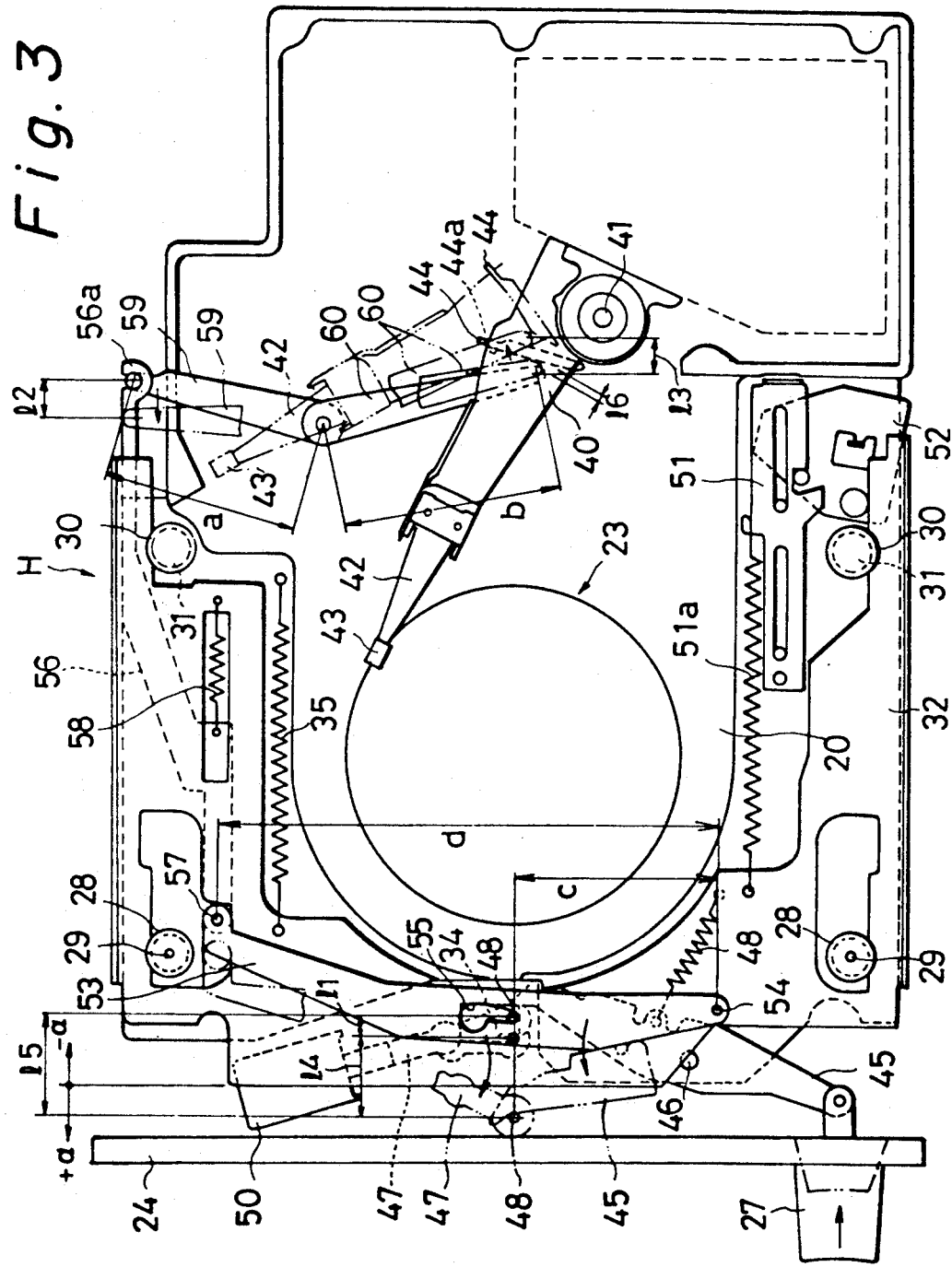
FIG. 3 is a plan view showing the construction of a disk cartridge loading apparatus in a first embodiment of the present invention.
Figure 4:
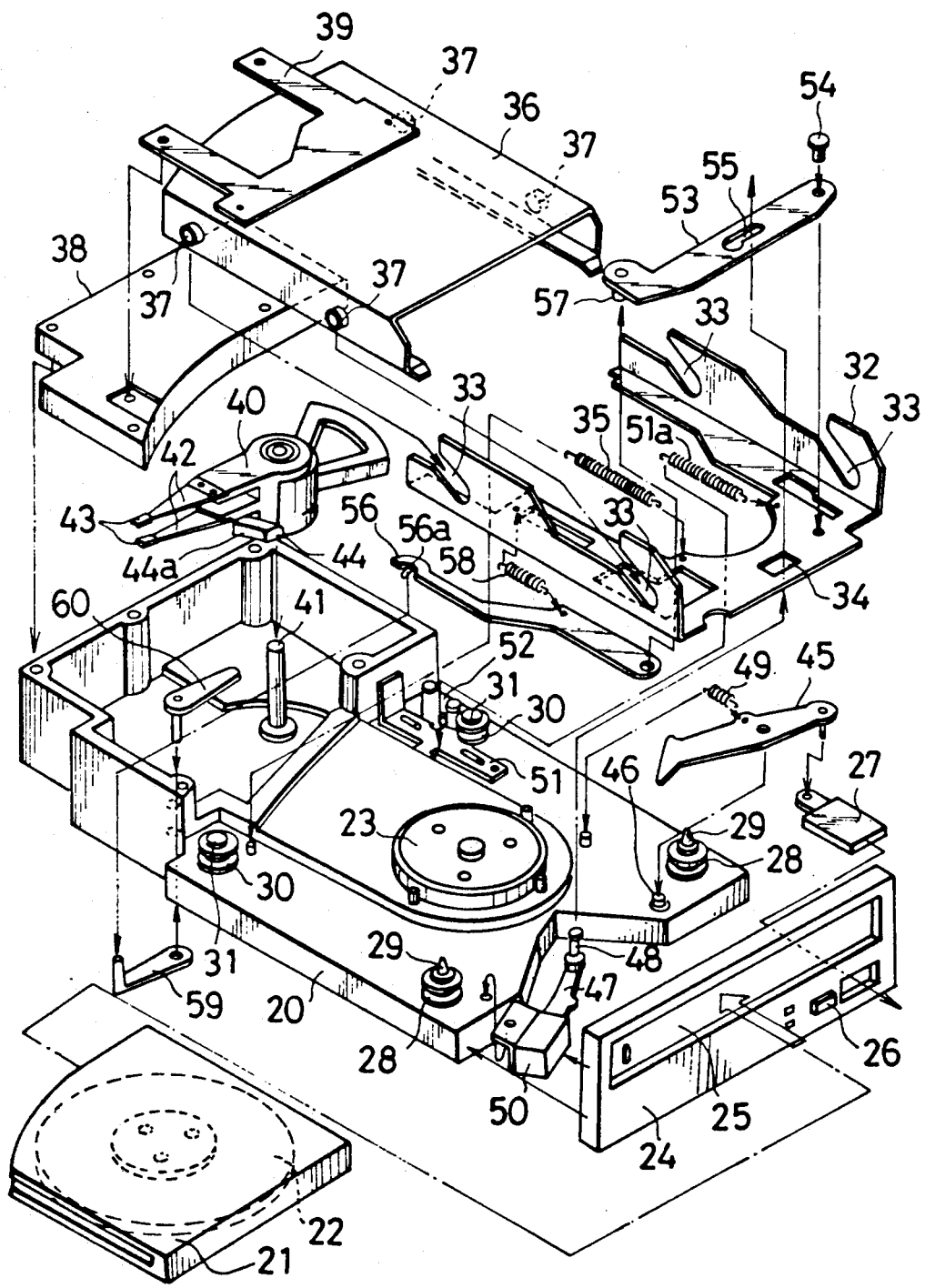
FIG. 4 is an exploded perspective view of the disk cartridge loading apparatus in the first embodiment.

FIG. 3 is a plan view showing the construction of a disk cartridge loading apparatus in a first embodiment of the present invention. FIG. 4 is an exploded perspective view of the disk cartridge loading apparatus in the first embodiment. In FIGS. 3 and 4, a deck 20 has a spendle motor 23 for rotating a recording disk 22 disposed in a disk cartridge 21. A front panel 24 is fixed to a front portion of the deck 20 and a front door 25, a start/stop switch 26, etc. are disposed in the front panel 24. An ejecting knob 27 is disposed in the front panel 24 such that the ejecting knob 27 can be moved into and out of the front panel 24. A pair of front carrier rollers 28 have cartridge guide pins 29 and are disposed in a front upper portion of the deck 20. A pair of rear carrier rollers 30 have cartridge-mounting portions 31 and are disposed in a rear upper portion of the deck 20. A slanting cam groove 33 is formed in each of four side portions of a carrier 32. A rectangular through hole 34 is formed in a front portion of the carrier 32. The carrier 32 is biased backward by the resilient force of a carrier spring 35.

A receiver 36 has a receiver roller 37 disposed in a side portion thereof and arranged on each of slanting cam grooves 33 of the carrier 32. The receiver 36 is supported by a rear cover 38 of the deck 20 through a leaf spring 39 such that the receiver 36 can be moved upward and downward. A head-accessing divice 40 is rotatably diposed around a rotary shaft 41 vertically disposed in a space portion formed by the deck 20 and the rear cover 38. The head-accessing device 40 constitutes a head moving means composed of an electromagnetic device. A head support arm 42 constitutes the head-accessing device 40. A recording-reproducing head 43 is fixed to an end portion of the head support arm 42. A retracting cam 44 is fixed to a side portion of the head-accessing device 40 and has an arc face 44a.

An ejecting lever 45 is rotatably supported by a pin 46 in a central portion thereof. One end of the ejecting lever 45 is engaged with the ejecting knob 27 and the other end of the ejecting lever 45 is engaged with an ejecting lock arm 47. An operating pin 48 is vertically disposed in the ejecting lock arm 47. An ejecting lever spring 49 biases the ejecting lever 45 such that the ejecting lever 45 is rotated around the pin 46 is the clockwise dirction. A solenoid 50 is disposed to operate the ejecting lock arm 47. An ejecting plate 51 is connected to the carrier 32 through an ejecting spring 51a. A latch 52 is engaged with the carrier 32.

One end of a retracting lever 53 is rotatably supported by a pin 54 on the carrier 32. A central portion of the retracting lever 53 has a hole 55 formed in the shape of a key and receiving the operating pin 48 through the through hole 34 of the carrier 32. The other end of the retracting lever 53 has a shaft body 57 engaged with one end of a rod 56. A rod spring 58 biases the rod 56 backward. One end of first retracting arm 59 is engaged with an arc portion 56a formed at the other end of the rod 56. One end of a second retracting arm 60 is rotatably engaged with the other end of the first retracting arm 59. The other end of the second retracting arm 60 comes in contact with the retracting cam 44 of the above head-accessing device 40. A head escaping means H is constructed by the retracting lever 53, the rod 56, the first retracting arm 59, the second retracting arm 60 and the retracting cam 44.

Figure 5:
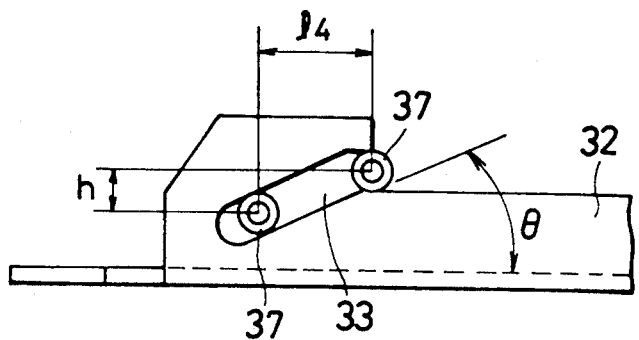
FIG. 5 is a side view showing a slanting cam groove portion in the disk cartridge loading apparatus in the first embodiment.

FIGS. 3 and 4, the disk cartridge 21 is inserted into the receiver 36 while the front door 25 of the front panel 24 is pushed by the disk cartridge 21. When the disk cartridge 21 is inserted into the receiver 36 until a deepest portion thereof, the disk cartridge 21 rotates the latch 52 while the ejecting plate 51 is pushed by a rear end of the disk cartridge 21. Thus, the carrier 32 is released from the latch 52 so that the carrier 32 is moved backward by applying tensile force of the carrier spring 35 to the carrier 32. Thus, as shown in FIG. 5, the receiver rollers 37 of the receiver 36 are moved to a lower portion of the slanting cam groove 33 of the carrier 32. Accoringly, when the receiver 36 is lowered, the disk cartridge 21 is also lowered so that the disk cartridge 21 is set on the cartridge guide pins 29 and the cartridge-mounting portions 31. In this state, the recording disk 22 within the disk cartridge 21 is arranged on the spindle motor 23, thereby attaining a known loading state.

When the disk cartridge 21 is ejected from the front door 25, an operator pushes the start/stop switch 26 and pushes-in the ejecting knob 27. Thus, the ejecting lever 45 is rotated around the pin 46 in the counterclockwise direction so that an end of the ejecting lever 45 presses the ejecting lock arm 47 forward. Accordingly, a front edge of the carrier 32 forming the through hole 34 is pressed forward by the operating pin 48 of the ejecting lock arm 47. Thus, the carrier 32 is moved forward against the resilient force of the carrier spring 35 and the receiver rollers 37 are moved to an upper portion of the slanting cam groove 33, thereby moving the receiver 36 upward. When the ejecting knob 27 is further pushed-in, an operating position of the latch 52 is returned to an original position thereof. Accordingly, the ejecting plate 51 receiving the resilient force of the ejecting spring 51a pushes the disk cartridge 21 out of the front door 25.

In the above first embodiment, when a power source is turned off by a certain cause at an accessing time of the head-accessing device 40, the recording-reproducing head 43 remains left on the recording disk 22. In such a case, similar to a normal ejecting operation, it is sufficient to push-in the ejecting knob 27 so as to eject the disk cartridge 21 out of the front door 25.

When the ejecting knob 27 is pushed-in by a stroke $l_1$, the ejecting lever 45 is rotated around the pin 46 in the counterclockwise direction. Thus, an end of the ejecting lever 45 presses the ejecting lock arm 47 forward so that the operating pin 48 of the ejecting lock arm 47 pushes a front edge of the retracting lever 53 forming the hole 55. Accordingly, the retracting lever 53 is rotated around the pin 54 in the counterclockwise direction. The shaft body 57 of the retracting lever 53 moves the rod 56 forward by this rotation of the retracting lever 53 in the counterclockwise direction. The first retracting arm 59 is rotated by this forward movement of the rod 56 so that the second retracting arm 60 is rotated by the first retracting arm 59 in the counterclockwise direction by an angle equal to a rotational angle of the first retracting arm 59. Thus, an end of the second retracting arm 60 comes in contact with the retracting cam 44 so that the head-accessing device 40 is rotated around the rotary shaft 41 through the retracting cam 44 in the clockwise direction. Accordingly, the recording-reproducing head 43 is moved through the head support arm 42 until a predetermined escaping position shown by a double-dotted chain line in FIG. 3.

When the ejecting knob 27 is further pushed-in, the ejecting lock arm 47 is further moved forward so that the operating pin 48 of the ejecting lock arm 47 comes in contact with a front edge of the carrier 32 forming the through hole 34. Accordingly, no carrier 32 is moved until the operating pin 48 comes in contact with the front edge of the carrier 32 forming the through hole 34. However, the rod 56 rotates and moves the first retracting arm 59 by a distance $l_2$ and the end of the second retracting arm 60 is moved by a distance $l_3$. Therefore, it is possible to escape the recording-reproducing head 43 as mentioned above.

When the ejecting knob 27 is further pushed-in from the above operating state, the carrier 32 is pressed and moved forward by the operating pin 48. Accordingly, as mentioned above, the disk cartridge 21 is pushed out of the front door 25. At this time, the rod 56 and the first retracting arm 59 are further moved forward from a position shown by the distance $l_2$ in accordance with a distance $l_4$ indicative of a latter operating stroke of the ejecting knob 27. The end of the second retracting arm 60 is also moved further from a position shown by the distance $l_3$. However, a center of curvature of the arc face 44a of the retracting cam 44 is set to be in conformity with a rotational center of the second retracting arm 60. Accordingly, the end of the second retracting arm 60 is slid on the arc face 44a of the retracting cam 44 so that no head-accessing device 40 is almost rotated.

As mentioned above, the escaping operation of the recording-reproducing head 43 is performed by the former stroke $l_1$ of an entire operating stroke $l_5$ of the ejecting knob 27. The ejecting operation of the disk cartridge 21 is performed by the latter stroke $l_4$. The ejecting operation of the disk cartridge 21 is performed without damaging the recording disk 22 and the recording-reproducing head 43 even when the power source is suddenly turned off and the recording-reproducing head 43 remains left on the recording disk 22.

There is dispersion in position of the carrier 32 in the forward and backward directions at a loading time of the disk cartridge 21. This dispersion is shown by distance $\pm\alpha$ in FIG. 3. Reference numeral a designates a distance from a rotational center of the first retracting arm 59 with respect to the rod 56 engaged therewith to a rotational center of the first retracting arm 59 with respect to the second retracting arm 60 engaged therewith when the head-accessing device 40 is located in an innermost position thereof shown by a solid line in FIG. 3. Reference numeral b designates a distance from the end of the second retracting arm 60 to the rotational center of the first retracting arm 59 with respect to the second retracting arm 60 engaged therewith. In this case, a clearance $l_6$ between the end of the second retracting arm 60 and the arc face 44a of the retracting cam 44 must satisfy the following condition (1).

$$l_6 > \frac{b}{a} \times \alpha \quad (1)$$

If the following condition (2) is satisfied, $$l_6 \leq \frac{b}{a} \times \alpha \quad (2)$$

the retracting cam 44 and the second retracting arm 60 come in contact with each other and cannot be moved to desirable positions thereof when the head-accessing device 40 begins to be moved to the innermost circumferential recording track on the recording disk 22.

When the position of the carrier 32 is shifted by a distance of the minus $\alpha$, the above clearance $l_6$ is provided as a clearance equal to or greater than the following value.

$$l_6 = \frac{b}{a} \times 2\alpha \quad (3)$$

Accordingly, the clearance $l_6$ becomes excessively large. Therefore, a start position of the stroke $l_3$ of the second retracting arm 60 at the end thereof provided by the stroke $l_1$ assigned for the escaping operation of the recording-reproducing head 43 is shifted on the left-hand side in FIG. 3. Accordingly, the head-accessing device 40 does not reach a position indicative of the completion of the escaping operation even when the head-accessing device 40 is moved by a distance indicative of the stroke $l_3$.

Accordingly, it is necessary to set the stroke $l_1$ for the escaping operation of the ejecting knob 27 to be large in consideration of the above dispersion in position of the carrier 32 with respect to the minus $\alpha$. If no distance of the entire operating stroke $l_5$ of the ejecting knob 27 is changed, it is necessary to reduce the stroke $l_4$ for the ejecting operation. When a lifting amount h of the receivers 37 shown in FIG. 5 is set to be constant, it is necessary to set an inclination angle $\theta$ of the slanting cam groove 33 to be large so that ejecting force must be increased.

Figure 6:
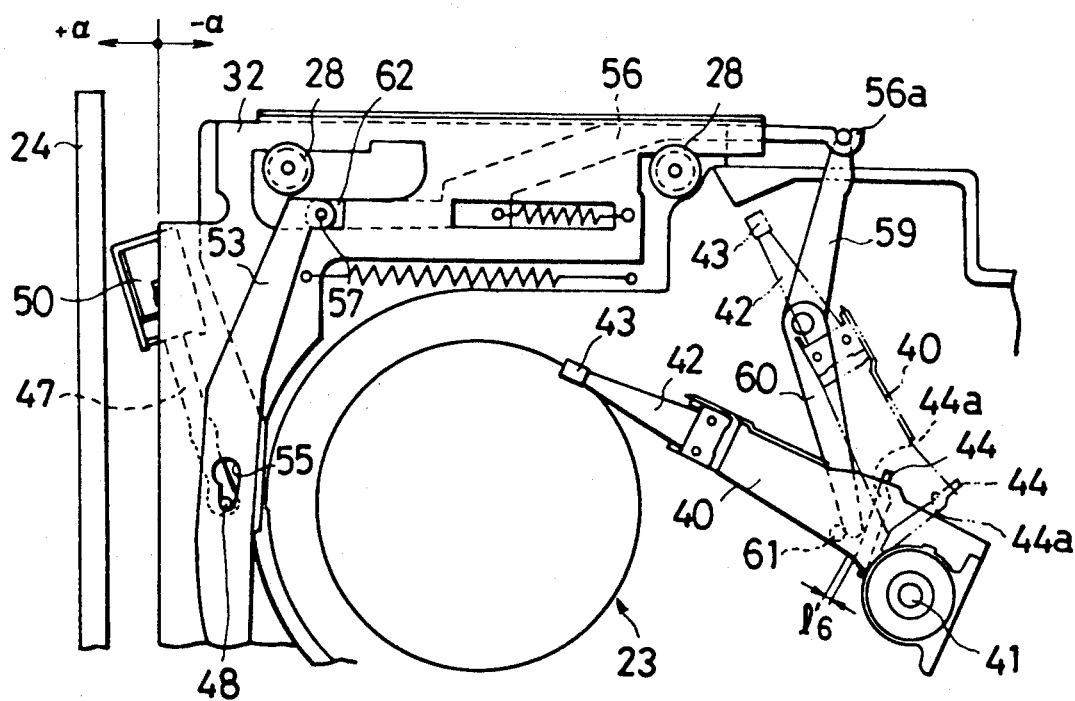
FIG. 6 is a view showing the construction of a main portion in a disk cartridge loading apparatus in a second embodiment of the present invention.

FIG. 6 is a view showing the construction of a main portion in a disk cartridge loading apparatus in a second embodiment of the present invention. A basic construction of this main portion shown in FIG. 6 is similar to that in the first embodiment. In FIG. 6, constructional portions corresponding to those in FIGS. 3 to 5 are designated by the same reference numerals and a detailed explanation thereof is therefore omitted in the following description.

In FIG. 6, the disk cartridge loading apparatus in the second embodiment is constructed in consideration of the above dispersion in position of the carrier 32 with respect to the $\pm\alpha$. Namely, this disk cartridge loading apparatus has a stopper 61 vertically disposed on the side of a spindle motor 23 with respect to a second retracting arm 60 and restraining an operating range of the second retracting arm 60. The dispersion in position of the carrier 32 with respect to the minus $\alpha$ is absorbed by this stopper 61. The disk cartridge loading apparatus in the second embodiment further has a notch stopper 62 disposed in a portion of the carrier 32 corresponding to an engaging portion of the retracting lever 53 and the rod 56. The notch stopper 62 comes in contact with the retracting lever 53 and restricts an operating range of this retracting lever 53. The dispersion in position of the carrier 32 with respect to the plus $\alpha$ is absorbed by this notch stopper 62.

Since the stoppers 61 and 62 are disposed in the second embodiment, no operation of a head escaping means H is influenced by the dispersion in position of the carrier 32 in the forward and backward directions thereof with respect to the $\pm\alpha$. A clearance $l_6'$ between an end of the second retracting arm 60 and an arc face 44a of a retracting cam 44 can be set to a value sufficiently smaller than the clearance $l_6$ shown by the above condition (1). Accordingly, it is possible to stably perform the escaping operation of a recording-reproducing head 43.

Figure 7:
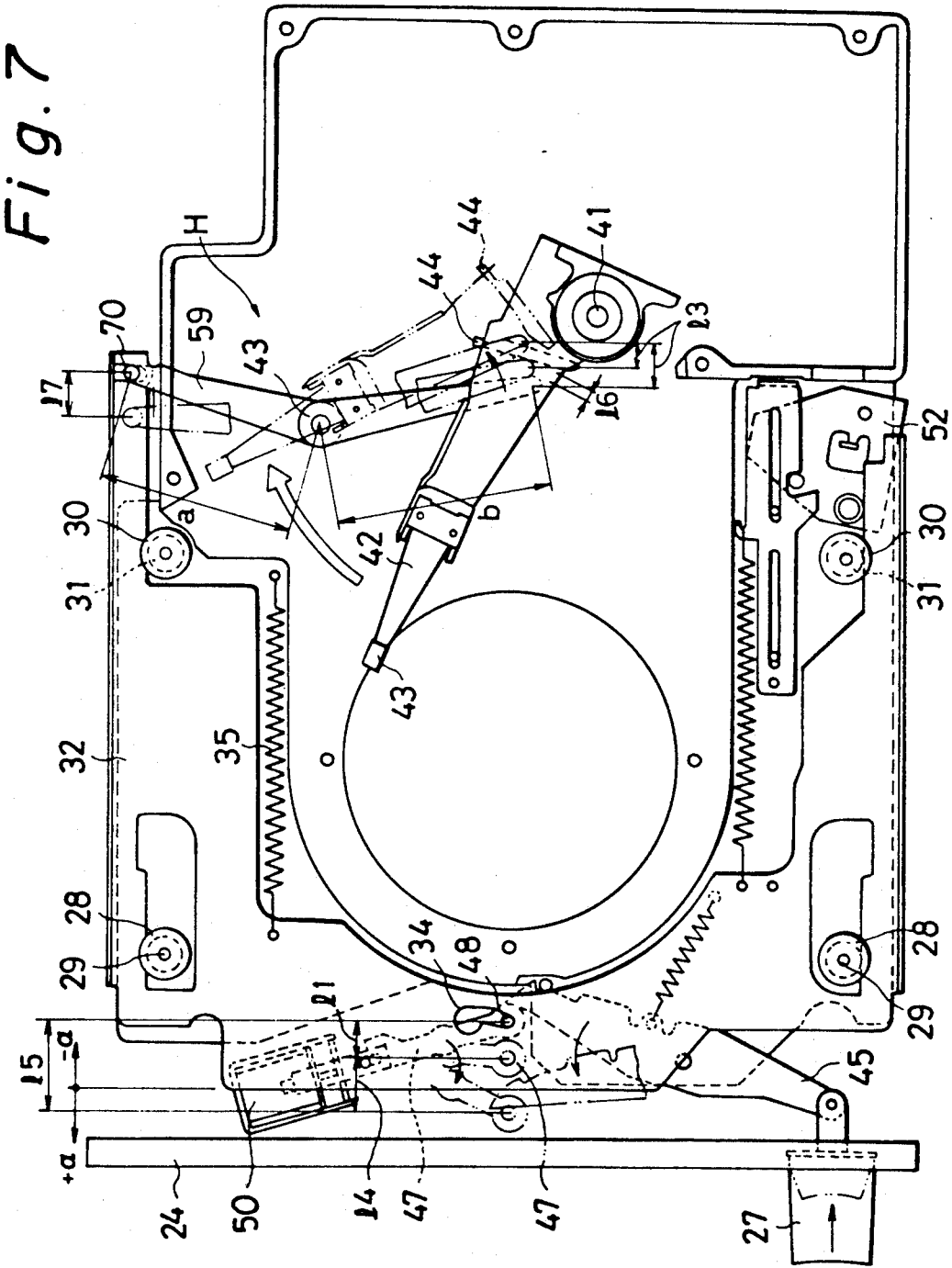
FIG. 7 is a plan view showing the construction of a disk cartridge loading apparatus in a third embodiment of the present invention.
Figure 8:
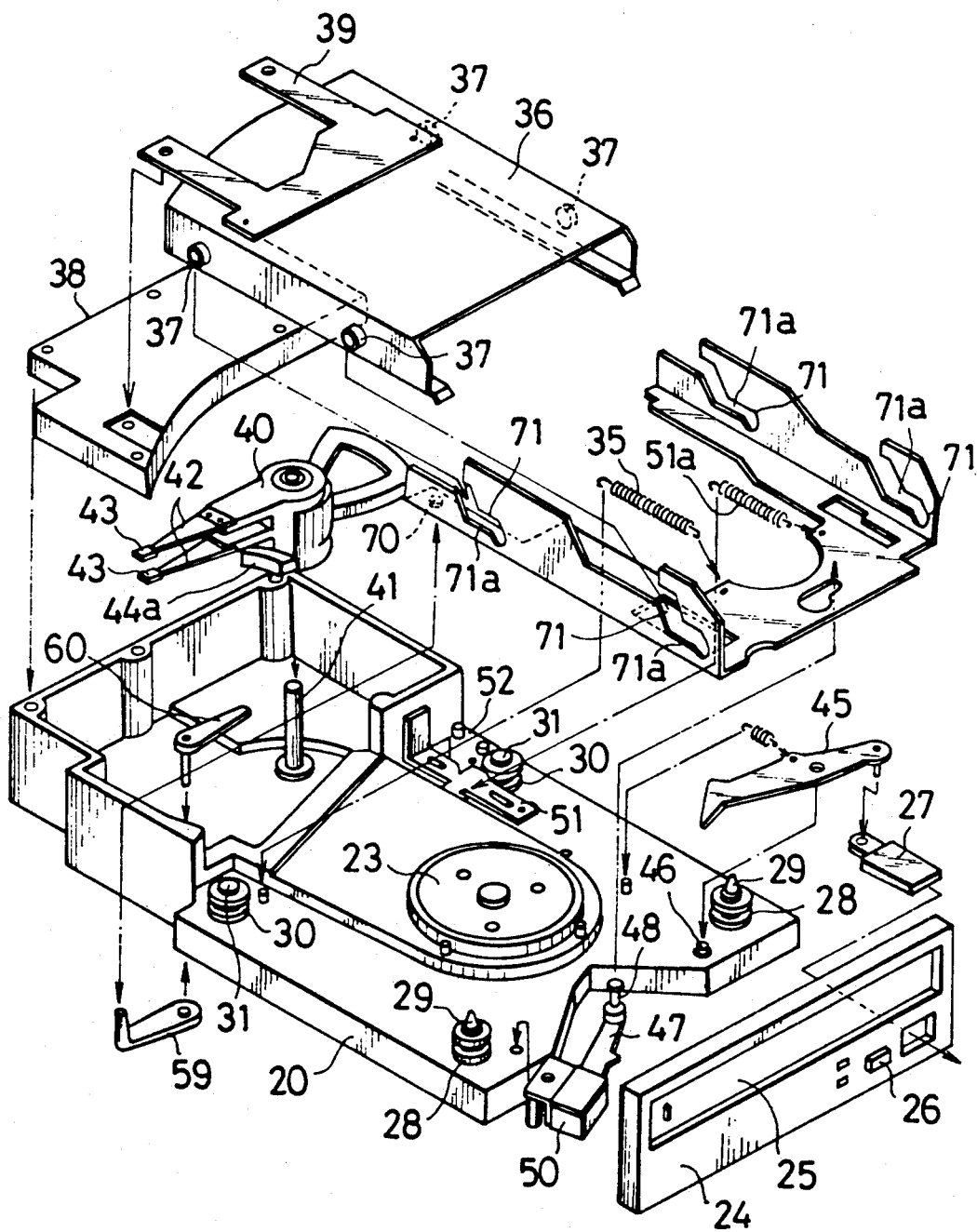
FIG. 8 is an exploded perspective view of the disk cartridge loading apparatus in the third embodiment.
Figure 9:
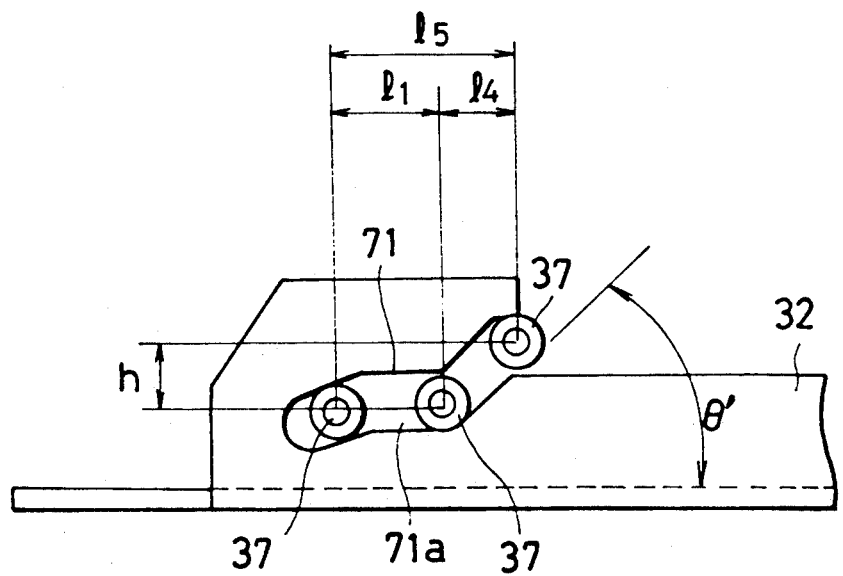
FIG. 9 is a side view showing a slanting cam groove portion in the disk cartridge loading apparatus in the third embodiment.

FIG. 7 is a plan view showing the construction of a disk cartridge loading apparatus in a third embodiment of the present invention. FIG. 8 is an exploded perspective view of the disk cartridge loading apparatus in the third embodiment. FIG. 9 is a side view showing a slanting cam groove portion in the disk cartridge loading apparatus in the third embodiment. In these figures, constructional portions corresponding to those in FIGS. 3 to 6 are designated by the same reference numerals and a detailed explanation thereof is therefore omitted in the following description.

The features of the disk cartridge loading apparatus in the third embodiment different from those in the first embodiment are the shape of a slanting cam groove and a structure in which the retracting lever 53 and the rod 56 are removed from the head escaping means H in the first embodiment. As shown in FIG. 7, an engaging portion 70 is formed by extending an upper right-hand end portion of a carrier 32. A first retracting arm 59 is engaged with the carrier 32 by the engaging portion 70.

Accordingly, similar to the first embodiment, when an ejecting knob 27 is pushed-in to escape a recording-reproducing head 43, an ejecting lever 45 is rotated so that an ejecting lock arm 47 moves the carrier 32 forward through an operating pin 48. The first retracting arm 59 is rotated by this forward movement of the carrier 32. Thus, similar to the first embodiment, a head-accessing device 40 can be rotated by a second retracting arm 60 and a retracting cam 44 until the recording-reproducing head 43 reaches a predetermined escaping position.

As shown in FIG. 9, a horizontal portion 71a is formed in a central portion of a slanting cam groove 71 of the carrier 32. A receiver roller 37 of a receiver 36 is located in the horizontal portion 71a at a former stroke $l_1$ of the ejecting knob 27 when the above escaping operation of the carrier 32 is performed. When the receiver roller 37 is located in the horizontal portion 71a, no position of the receiver roller 37 is changed and the receiver 36 and a disk cartridge 21 stored in the receiver 36 are not raised so that no disk cartridge 21 is moved out of the receiver 36.

In the third embodiment, the ejecting operation is performed at a latter stroke $l_4$ of the ejecting knob 27. However, since the disk cartridge loading apparatus has no link mechanism disposed in the first embodiment, a moving distance $l_7$ of the first retracting arm 59 is equal to the former stroke $l_1$ of the ejecting knob 27. Accordingly, if an entire operating stroke $l_5$ of the ejecting knob 27 is equal to that in the first embodiment, the latter stroke $l_4$ is reduced so that an inclination angle $\theta'$ of the slanting cam groove 71 is increased. Therefore, pressing force of the ejecting knob 27 is increased, but the structure of the head escaping means H is simplified.

In contrast to this, in the first embodiment, the former stroke $l_1$ of the ejecting knob 27 is provided by the following formula (4).

$$l_1 = l_2 \times \frac{c}{d} \quad (4)$$

In this formula (4), as shown in FIG. 3, reference numeral c designates a distance from a center of the pin 54 of the retracting lever 53 to a center of the operating pin 48 of the ejecting lock arm 47. Reference numeral d designates a distance from the center of the pin 54 of the retracting lever 53 to an engaging portion (the shaft body 57) of the retracting lever 53 and the rod 56.

Accordingly, in the first embodiment, when a ration c/d is set to 0.5, the stroke $l_1$ is half the stroke $l_2$ so that it is possible to increase the latter stroke $l_4$ and reduce the above inclination angle $\theta$. Therefore, it is possible to reduce the pressing force of the ejecting knob 27 in comparison with the third embodiment.

As mentioned above, in accordance with the present invention, the escaping operation of the recording-reproducing head is performed at the former operating stroke of the ejecting knob. The ejecting operation of the disk cartridge is performed at the latter operating stroke of the ejecting knob. Accordingly, it is possible to provide a disk cartridge loading apparatus for reliably ejecting the disk cartridge even when a power source is suddenly turned off at an access time of the disk cartridge loading apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disk cartridge loading apparatus for ejecting a disk cartridge from a loading state of the disk cartridge reliably, said apparatus comprising:
   a deck;
   an ejecting knob disposed in a front panel fixed to a front portion of the deck and adapted to be pushed in a two-step stroke comprising a former operating stroke and a latter operating stroke;
   a carrier for the disk cartridge;
   an ejecting lever disposed on the deck rotatably at a center portion thereof, and engaged with the ejecting knob at one end thereof;
   an ejecting lock arm disposed on the deck rotatably at one end thereof;
   an operating pin disposed on another end of the ejecting lock arm, and engaged with another end of the ejecting lever and loosely engaged with a through hole of the carrier;
   a head accessing device disposed on the deck rotatably for supporting and moving a recording-reproducing head; and
   a head escaping means engaged with the ejecting lock arm and with the head accessing device, the head accessing device being adapted to be moved to a predetermined escaping position with the recording-reproducing head by operation of the head escaping means during the former operating stroke of the ejecting knob and the operating pin abutting a front edge of the through hole during the latter operating stroke of the ejecting knob.

2. A disk cartridge loading apparatus as claimed in claim 1, wherein said apparatus further comprises a stopper for restricting an operating range of said head escaping means.

3. A disk cartridge loading apparatus as claimed in claim 1, wherein an ejecting operation of the disk cartridge is performed at the latter operating stroke of the ejecting knob in a state in which the recording-reproducing head is escaped from a recording disk.

4. A disk cartridge loading apparatus as claimed in claim 1, wherein the carrier further comprises a slanting cam groove having a horizontal portion in a central portion thereof.

5. A disk cartridge loading apparatus as claimed in claim 4, wherein an ejecting operation of the disk cartridge is performed at the latter operating stroke of the ejecting knob provided by the horizontal portion of the slanting cam groove.

* * * * *